(12) United States Patent
Richiger

(10) Patent No.: US 8,420,139 B2
(45) Date of Patent: Apr. 16, 2013

(54) CAPSULE FOR INFUSION BEVERAGES

(75) Inventor: Jacques Richiger, Heimberg (CH)

(73) Assignee: Nestec S. A., Vevey (CH)

( * ) Notice: Subject to any disclaimer, the term of this patent is extended or adjusted under 35 U.S.C. 154(b) by 167 days.

(21) Appl. No.: 12/863,559

(22) PCT Filed: Nov. 25, 2008

(86) PCT No.: PCT/CH2008/000495
§ 371 (c)(1),
(2), (4) Date: Aug. 20, 2010

(87) PCT Pub. No.: WO2009/092172
PCT Pub. Date: Jul. 30, 2009

(65) Prior Publication Data
US 2011/0020499 A1  Jan. 27, 2011

(30) Foreign Application Priority Data
Jan. 23, 2008  (EP) .................................... 08405022

(51) Int. Cl.
*B65B 29/02* (2006.01)
(52) U.S. Cl.
USPC .............. 426/77; 426/431; 99/295; 99/302 R; 99/303
(58) Field of Classification Search .............. 426/77–80, 426/431–433; 99/295, 323, 302 R, 303; 222/107, 215; 206/0.5
See application file for complete search history.

(56) References Cited

U.S. PATENT DOCUMENTS

| 4,581,239 A * | 4/1986 | Woolman et al. ............. 426/433 |
| 4,853,234 A * | 8/1989 | Bentley et al. ................. 426/77 |
| 2002/0078831 A1 | 6/2002 | Cai |
| 2003/0056661 A1 | 3/2003 | Hu et al. |

FOREIGN PATENT DOCUMENTS

| WO | WO 2006/016813 A2 | 2/2006 |
| WO | WO 2007/137974 A2 | 12/2007 |

* cited by examiner

*Primary Examiner* — Drew Becker
*Assistant Examiner* — Luana Z Long
(74) *Attorney, Agent, or Firm* — Birch, Stewart, Kolasch & Birch, LLP

(57) ABSTRACT

The invention relates to a capsule and a device for preparing an infusion beverage, such as coffee, tea, or milk beverages. The capsule comprises two parallel extending wall sections, which are connected to each other by a sealing connection. A pressurized liquid or gaseous medium can be conducted through an access to the sealing connection of the capsule with the aid of a supply line in a holder of the device such that the sealing connection is partially undone. As a result, an opening is produced in the capsule. An infusion fluid can be conducted through the opening, wherein the fluid can then become mixed with a powder or granules present in the capsule into an infusion beverage. The infusion beverage can be discharged through a further opening.

16 Claims, 3 Drawing Sheets

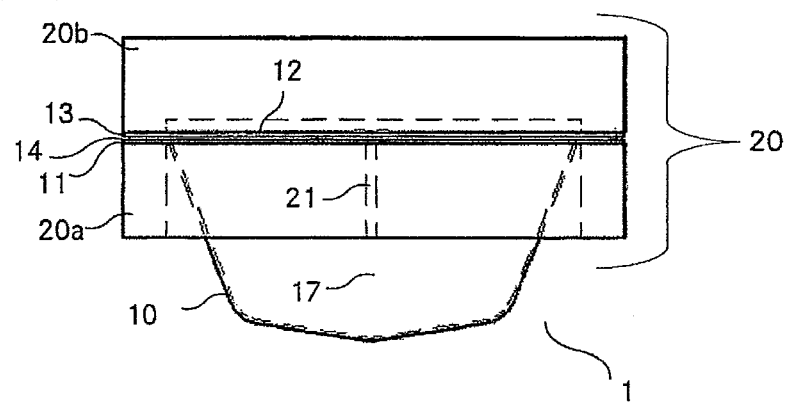
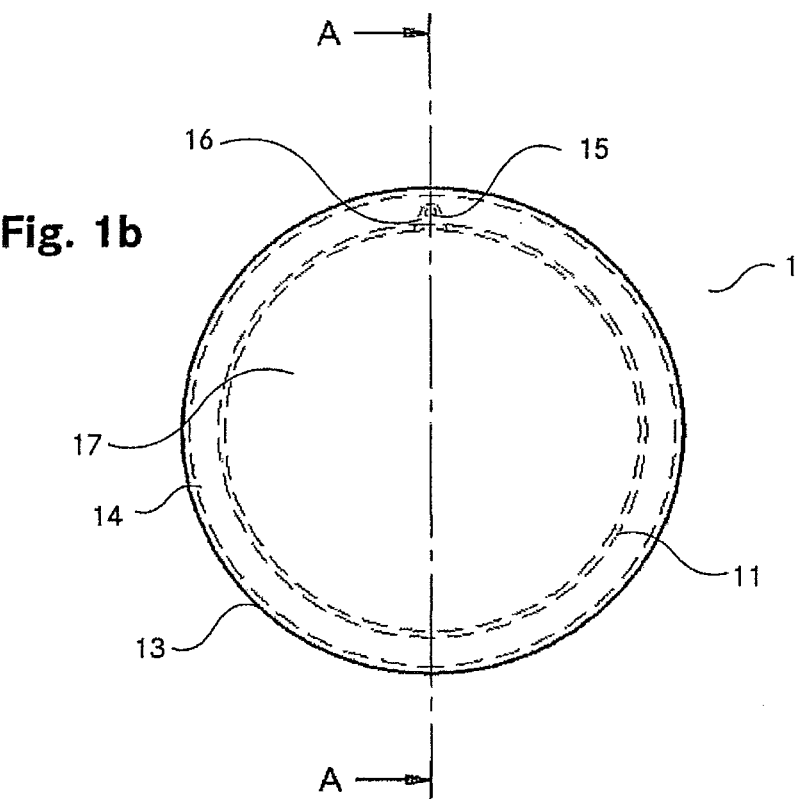

CAPSULE FOR INFUSION BEVERAGES

TECHNICAL FIELD

The invention relates to a capsule for preparing an infusion beverage, such as for example coffee, tea or a milk beverage, the capsule comprising two parallel wall portions which are connected at least in part by a sealing connection. Furthermore, the invention relates to a device and also to a method for preparing an infusion beverage using the capsule.

PRIOR ART

For preparing infusion beverages, in particular coffee or milk beverages such as chocolate milk, it is known to use a capsule which is filled with the corresponding powder or granules of the infusion beverage. For this purpose, the unconsumed, closed capsule is secured with the aid of a device configured specially for this purpose and then opened from above, thus producing an inlet opening. A sharp or pointed object in the form of a knife or a needle is generally used for opening the capsule.

A further possibility for opening the inlet opening is mentioned in document US 2002/0078831 A1 (Cai): The inlet opening is closed with a special membrane which is then burst as a result of the pressure of an infusion liquid. The infusion liquid (Which is in most cases hot water) is introduced into the capsule through the inlet opening under pressure. The inlet opening is in this case sealed, so that the infusion liquid cannot escape, despite the pressure thereof, at the inlet opening. The infusion liquid blends with the powder or granules and is then let out as an infusion beverage via one or more outlet openings at the bottom of the capsule. Generally speaking, the outlet openings are produced in that a special foil or a wall at the underside of the capsule is burst from the inside as a result of the pressure of the infusion liquid. Predetermined breaking points may be provided so that the wall of the capsule or the special foil can burst more effectively. It is also possible for the foil or the bottom to be pressed, as a result of the pressure of the infusion liquid, against a sharp-edged or pointed structure which then perforates the foil or the bottom. The pressure of the infusion liquid is not only necessary for opening the outlet opening, but likewise also influences the quality of the infusion beverage.

If a pointed or sharp object is used for opening the capsule, then this has the drawback that the object can contaminate the infusion beverage during opening and the subsequent introduction of the infusion liquid into the capsule. This can lead to losses of taste or even to hygiene problems. Contamination can have serious consequences for hygiene, specifically in relation to milk-containing infusion beverages. It is not possible to automatically rinse the needle or the knife with a rinsing liquid as it is with the inner space of a line. This in itself requires more sophisticated cleaning means.

In addition, the needle and knife can become blunt and therefore perforate the foil or the wall of the capsule less effectively. Replacing (or sharpening) the needle or the knife involves maintenance costs.

A further drawback is the fact that the inlet opening and also the outlet opening remain open after use of the capsule. In the method according to US 2002/0078831 A1 too, in which the membrane is burst in the inlet opening as a result of the pressure of the infusion liquid, the inlet opening remains open, as the membrane is permanently damaged. This allows a residual liquid which remains in the capsule to flow out after the capsule has been removed from the machine.

ACCOUNT OF THE INVENTION

The problem of the invention is to provide a capsule pertaining to the technical field mentioned at the outset and also a device and method associated therewith allowing the capsule to be opened in a gentle manner so as to prevent contamination of the infusion beverage.

The solution to the problem is defined by a capsule having the features of claim 1, a device having the features of claim 9 and by a method according to claim 12. According to the invention, the capsule for infusion beverages comprises two parallel wall portions which are connected at least in part by a sealing connection. This sealing connection ensures that the capsule is closed in an air-tight manner. There is now an access to a region of this sealing connection from the outside, so that the sealing connection is at least in part undone as a result of the introduction of a pressurized liquid or gaseous medium. This produces in the interior of the capsule an opening through which an infusion liquid for preparing the infusion beverage can be introduced. The finished infusion beverage leaves the capsule via an outlet opening of the capsule. The outlet opening is opened in a previously known manner as a result of the pressure of the infusion liquid in the interior of the capsule.

A device according to the invention for preparing the infusion beverage using the capsule according to the invention comprises a holder for the capsule and at least one feed line. This feed line guides a pressurized liquid or gaseous medium to the access to the sealing connection of the capsule inserted in the holder. As a result of the supplying of the medium, the sealing connection between the wall portions of the capsule is detached on account of the pressure of the medium. This produces an opening into the interior of the capsule through which an infusion liquid for preparing the capsule can be guided.

Within the scope of the method according to the invention for preparing the infusion beverage, the capsule is in particular inserted into a device according to the invention. A pressurized liquid or gaseous medium is guided to the sealing connection via the access to the sealing connection. As a result of the pressure of this medium, the sealing connection is undone and an opening is produced for introducing an infusion liquid into the capsule.

An advantage of the opening according to the invention of the capsule is the fact that no parts or objects, such as a needle or knife, become worn. There are thus fewer wearing parts. Nor does the creation of the inlet opening require a tool, such as a needle or a blade, to be mechanically moved; this allows a simpler technical implementation of the device. In addition, the risk of contamination is greatly reduced, as no objects or parts protrude into the infusion liquid received by the capsule. This allows hygiene problems and the risk of a loss of taste to be minimized.

In addition, one of the advantages of the method according to the invention consists in the fact that none of the wall portions for letting-in the infusion liquid has to become damaged. In addition, as soon as the pressure of the medium for opening the capsule and also the pressure of the infusion liquid are no longer exerted, the two wall portions approach each other again and thus form a certain protection preventing a residual liquid from flowing out of the capsule.

In a preferred embodiment, the capsule is composed of two parts each having a wall portion. In this case, the two wall portions run parallel to each other and are joined by the sealing connection. These two parts then enclose a hollow space into which the powder or granules for the infusion beverage is/are poured. This allows the capsule to be filled in a simple, cost-effective and hygienic manner.

Alternatively, the capsule can be formed in one piece. Thus, for example, a rectangular foil can be folded up and closed at three rims by an air-tight sealing connection in such a way that a hollow space is produced. It is also possible for the capsule to have the shape of a tube, the ends of which are each closed by a sealing connection.

In a preferred embodiment of the capsule, one wall portion is dimensionally stable in the aforementioned region of the sealing connection and the other wall portion is flexible. The term "dimensionally stable" means in particular that a force for deforming the dimensionally stable wall portion would have to be greater than the adhesive force of the sealing connection on this wall portion. This allows the sealing connection to be effectively detached from this wall portion. On the other hand, the term "flexible" means that the pressure applied can deform the corresponding wall portion in such a way as to produce between the two wall portions an inlet opening through which the infusion liquid can be guided into the interior of the capsule. In this case, the flexible wall portion may be both plastically and resiliently deformable. If the flexible wall portion is resilient, then this has the advantage that, when the pressure is no longer exerted, the flexible wall portion approaches the dimensionally stable wall portion again and in this way the opening is partly closed.

Alternatively, it is conceivable for the medium for opening the capsule to be guided to the sealing connection in such a way that the pressure of the medium deforms the two wall portions and in this way pushes them apart from each other. This requires both wall portions to be flexible.

In a preferred embodiment, the dimensionally stable wall portion is made of a flexible material which is additionally reinforced by a dimensionally stable layer in the region of the access to the sealing connection. This additional dimensionally stable layer can for example consist of a thicker layer of the same flexible material that becomes, as the layer is now thicker, dimensionally stable in the above-described sense. It is, however, also possible for the additional layer to be made of a material which is different from the flexible material. This additional layer does not have to cover the entire flexible material; on the contrary, it may extend only onto the region of the access to the sealing connection. This has the advantage of allowing material, and thus also costs, to be saved.

As mentioned above, the alternatives consist in the pressure for opening the sealing connection pushing both wall portions, which are now flexible, apart or in the dimensionally stable wall portion itself being made of a dimensionally stable material.

In a preferred embodiment, the capsule consists of a dimensionally stable container, to which the dimensionally stable wall portion pertains, and a flexible, substantially flat foil to which the flexible wall portion pertains. A part of a wall portion of the foil and also a part of the container run parallel to each other and are connected to each other at least in part by the sealing connection. A correspondingly constructed capsule may be manufactured and filled in a streamlined manner and is convenient for the end user to handle.

An alternative possibility is two containers which are then held together at their edges by a sealing connection. In this case, it is conceivable for both containers to be made of a flexible material but for one wall portion to be reinforced as described above.

In a preferred embodiment, both the container and the foil are rotationally symmetrical. Their parallel wall portions then form a peripheral flange, so that the sealing connection runs annularly, along the flange. A rotationally symmetrical shape of the container and also the foil has the advantage that the infusion liquid blends effectively with the powder or with the granules in the capsule. In addition, capsules of this type are easy to handle both by hand and by machine.

Alternative shapes of the container and also the foil are conceivable. In this case, factors such as stackability or positioning of the capsule can determine the shape of the capsule. Thus, for example, cuboid capsules with a rectangular foil can be stacked more compactly than cylindrical or conical containers with circular foils.

In a preferred embodiment, the access to the sealing connection is provided by an aperture in the dimensionally stable wall portion of the capsule. The access thus runs substantially perpendicularly to the parallel main faces of the wall portions in the region of the sealing connection. This has the advantage that an aperture of this type can easily be produced in capsules known in the art. It is thus possible to manufacture capsules which can be opened both by the conventional devices by means of a needle or a knife and by the method according to the invention.

The sealing connection can also be accessed laterally, in parallel along the parallel wall portions. Any feed line to the sealing connection, for example a tube, may be located between the two wall portions, in a region which does not contain a sealing connection. However, the free end of the feed line would touch the sealing connection.

In a preferred embodiment, the capsule has a plurality of apertures or accesses to the sealing connection. It is not necessary for all the accesses to the sealing connection to be used during use or for the sealing connection to be detached at each access thereto. An advantage of a plurality of accesses consists in the fact that the capsule does not have to be precisely positioned. This facilitates handling, specifically in the case of a rotationally symmetrical capsule. If, in addition, a plurality of accesses are indeed also used during the preparation of the capsule, then more thorough blending of the infusion liquid with the powder or granules is possible in the capsule.

Alternatively, there may also be just one aperture to the sealing connection. As a result of appropriate shaping of the capsule or as a result of special profilings, it is possible to align at all times the access to the sealing connection with the feed line of the device.

In a preferred embodiment of the device according to the invention, its holder for the capsule is embodied in such a way that it at least partially secures the wall portions of the capsule that are connected by the sealing connection. As a result, it is possible to ensure that wall portions of the capsule that should not become separated are held together.

Alternatively, the holder can be embodied independently of the device for opening the capsule.

In a preferred embodiment, the device has a receiving space which can at least partly receive the wall portions. In this case, the receiving space is embodied in such a way that the parallel wall portions are enclosed on both sides in an outer region in such a way that detachment of the sealing connection is prevented outward and allowed inward. This has the advantage that the sealing connection can become detached only where it is intended to do so. In particular, the production of a further, undesired opening in the capsule is prevented. The receiving space allows the flexible wall portion to arch out and therefore to move away from the opposing wall portion after the sealing connection has become detached. This produces an opening. At the same time, the receiving space can support the arched-out wall portion in such a way that the wall portion neither tears, bursts, nor is damaged in any other way.

Alternatively, it is possible for an outer part of the wall portion not to be held together by the device. In this case, the composition of the capsule may be such that those points of the two wall portions that may not be separated are held together by a different type of connection; for example, in that the two wall portions are directly welded or connected by a sealing connection having greater adhesiveness at those points which may not become detached.

Advantageously, the pressure of the medium for undoing the sealing connection is between 10 bar and 20 bar, in particular between 13 bar and 16 bar.

The magnitude of the pressure may also lie outside this range. What matters is the adhesive force of the sealing connection. Depending on the sealing connection used, the pressure has to be selected accordingly. The indicated range is sufficient to allow sealing connections produced in accordance with the prior art to be undone.

In a preferred embodiment, the medium for opening the sealing connection is identical to the infusion liquid (in particular to heated water having a temperature of approx. 65-85° C.). This has the advantage that when the infusion liquid is let into the capsule, the infusion liquid itself can open the capsule. This eliminates the need for a second medium for opening the capsule. If—as indicated above—a pressure between 10 bar and 20 bar, in particular between 13 bar and 16 bar, is selected, the same pressure can be used for opening and for preparing the infusion beverage (for example of coffee).

Alternatively, a different medium, for example air, can be used for opening the capsule. As a result, different pressures can be used for opening and also for preparing the infusion beverage. Thus, a short but intensive blast of air could open the capsule. Afterwards, the infusion liquid is let into the capsule under lower pressure.

Further advantageous embodiments and combinations of features of the invention will emerge from the following detail-type description and all of the patent claims.

BRIEF DESCRIPTION OF THE DRAWINGS

In the drawings used to explain the exemplary embodiment:

FIG. 1a is a side view of the capsule with the holder;
FIG. 1b is a view from above onto the capsule in the holder;
FIG. 2b is a detail-type view of the section according to FIG. 2a.

As a matter of principle, like parts are provided with like reference numerals in the figures.

WAYS OF CARRYING OUT THE INVENTION

Figure 2A:
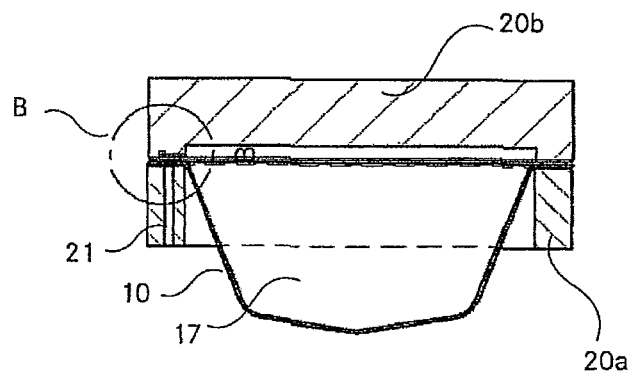
FIG. 2a is a section through the capsule and the holder.

FIG. 1a shows a capsule 1 which is secured by a holder 20 of a device for preparing an infusion beverage. The capsule 1 consists of a dimensionally stable, conical container 10 which increases in size toward the top. A hollow space 17 is formed within the container 10. A wall portion 11 at the edge of the container 10 is bent outward horizontally, forming a flange. The capsule 1 also consists of a circular, flexible foil 12 which closes the container 10 in that a wall portion 13 at the edge of the foil 12 is connected to the wall portion 11 by a sealing connection 14. The sealing connection 14 thus runs annularly along the flange between the two wall portions 11 and 13. The capsule 1 is secured by the holder 20 of the device, consisting of a lower holder part 20a and an upper holder part 20b. The lower holder part 20a has a feed line 21 leading vertically from below to the wall portion 11 of the container 10.

FIG. 1b shows from above the same arrangement as in FIG. 1a. An aperture, in the form of a hole 15 in the wall portion 11 of the container 10, may be seen in this figure. The capsule 1 is positioned in the holder in such a way that the hole 15 is aligned with the upper end of the feed line 21 in the holder 20. It is also possible to see a region 16 of the sealing connection 14 in which, when the capsule 1 is opened, the sealing connection 14 is undone and thus allows access into the hollow space 17 of the capsule 1.

Figure 2B:
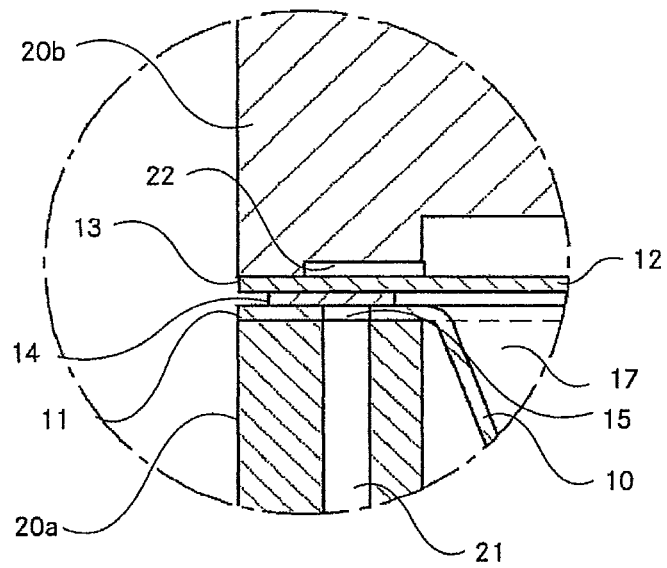

FIG. 2a is a longitudinal section along an axis A-A through the capsule 1 and also shows the feed line 21 which is located in the drawing on the left-hand side of the container 10. FIG. 2b is a detail-type view of a region B enclosing the upper end of the feed line 21, the hole 15, the two wall portions 11 and 13 and also the sealing connection 14. FIG. 2b shows the capsule while it is still closed. Thus, the sealing connection 14 covers the hole 15 in the wall portion 11 of the lower holder part 20a. As mentioned above, the feed line 21 ends at the hole 15. This produces a direct access for a liquid or gaseous medium to the sealing connection 14. The wall portion 13 of the foil 12 is located opposite the wall portion 11, clinging directly to the sealing connection 14. The upper holder part 20b is located above the wall portion 13. The outer edges of the wall portions 11 and 13 are held together by the upper and also lower holder parts 20a and 20b. The wall portion 11 of the container is supported by the holder part 20a over the entire length of the wall portion 11 except for in the hole 15. A hollow receiving space 22 is located in the upper holder part 20b, in the extension of the feed line 21, directly adjoining the wall portion 13. This receiving space 22 is radially outwardly closed off by the holder part 20b in relation to the capsule. Radially inwardly, this receiving space 22 extends up to the height at which the hollow space 17 of the capsule 1 begins on the container side, the hollow space being formed by the container 10.

Figure 3A:
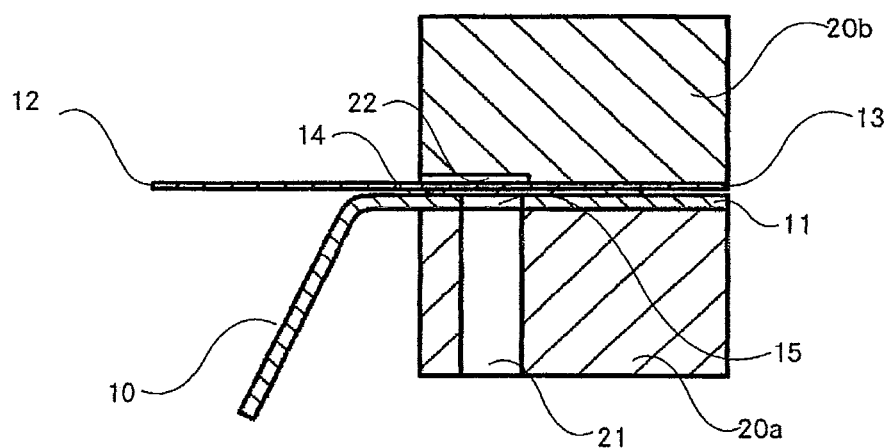
FIG. 3a is a section through the detail-type view of the capsule in the closed state.
Figure 3B:
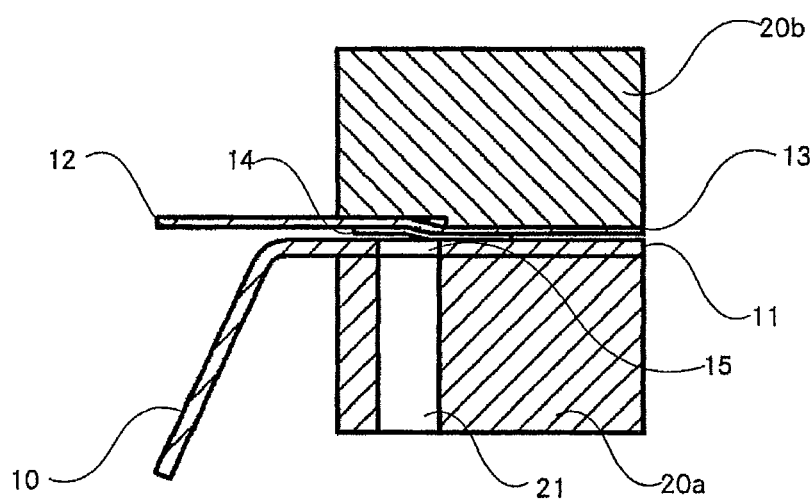
FIG. 3b is a section through the detail-type view of the capsule in the open state.

FIGS. 3a and 3b are a longitudinal section along the axis A of the view from FIG. 1b. FIG. 3a shows the closed state of the capsule 1 in which the sealing connection 14 has not yet separated from the wall portion 11 of the container 10.

A liquid or gaseous medium is now guided under pressure to the sealing connection 14 through the feed line 21 and through the hole 15 in the container 10. On account of the pressure, this medium exerts a force on the sealing connection and on the wall portion 13 of the flexible foil 12. As the wall portion 11 of the container is dimensionally stable, that is to say the force which would be required for deforming the wall portion 11 is greater than the adhesive force of the sealing connection 14 on the wall portion 11, the sealing connection 14 becomes detached from the wall portion 11. However, the sealing connection 14 can become detached only where the wall portion 13 of the foil 12 is not held. That is to say, the sealing connection becomes detached at the point at which the receiving space 22 is located behind the wall portion 13. Owing to this receiving space 22, the wall portion 13 can arch such as is illustrated in FIG. 3b. This produces a gap between the sealing connection 14 and the wall portion 11. An infusion liquid can now be introduced into the hollow space 17 of the container 10 through the same feed line 21 through this gap. The sealing connection 14 cannot become detached at the point at which the two holder parts 20*a* and 20*b* hold the wall portions 11 and 13 together, as there is no space for the arching of the wall portion.

In the exemplary embodiment shown, the holder contains just one feed line and the dimensionally stable wall portion contains just one hole. When the capsule is inserted into the holder, it is therefore necessary to position the hole in the dimensionally stable wall portion exactly above the feed line. It is now possible for holes to be present throughout the flange of the dimensionally stable wall portion. If the ratio between the diameter of the holes and the feed line and also the number of holes are selected correctly, then one hole will always be positioned above the feed line, irrespective of the orientation of the capsule.

The shape of the capsule may vary. Instead of the conical shape, the capsule could be cylindrical. Instead of being outwardly bent, the bottom could also be flat or arched inward. The shape of the capsule influences how effectively the infusion liquid blends with the powder or the granules of the capsule. The capsule does not have to be rotationally symmetrical. If, for example, it has a non-uniform outer contour, this can ensure that the hole in the dimensionally stable wall portion and the feed line in the lower holder part are always aligned because the capsule can be inserted into the holder only in a specific orientation.

It is possible for the capsule to contain strainers which prevent non-dissolved parts of the powder or the granular material from being able to flow out.

In summary, it may be stated that the invention provides a capsule and also a device and method associated therewith for preparing an infusion beverage allowing the capsule to be opened in a gentle manner so as to allow contamination of an infusion beverage to be reduced.

The invention claimed is:

1. A capsule for infusion beverages, comprising two parallel wall portions which are connected at least in part by a sealing connection, whereas the sealing connection has a region to which there is an access from the outside, so that at least a part of the sealing connection can be undone by introducing a pressurized liquid or gaseous medium through this access, to create an opening for introducing an infusion liquid into the capsule, wherein said access is arranged to run substantially perpendicular to the parallel main faces of the two wall portions in the region of the sealing connection.

2. The capsule as claimed in claim 1, the capsule being assembled from two parts, the two parts being connected by the sealing connection.

3. The capsule as claimed in claim 1, whereas a first of the wall portions is dimensionally stable in the aforementioned region of the sealing connection and the second of the wall portions is flexible in this region.

4. The capsule as claimed in claim 3, whereas the first, dimensionally stable wall portion is made of a flexible material which is reinforced with the aid of a second, dimensionally stable layer.

5. The capsule as claimed in claim 4, whereas the first wall portion pertains to the wall of a dimensionally stable container and the second wall portion pertains to the wall of a flexible, substantially flat foil.

6. The capsule as claimed in claim 3, whereas the first wall portion pertains to the wall of a dimensionally stable container and the second wall portion pertains to the wall of a flexible, substantially flat foil.

7. The capsule as claimed in claim 6, the container and the foil being substantially rotationally symmetrical and the wall portions a peripheral flange, so that the sealing connection runs annularly.

8. A capsule for infusion beverages, comprising two parallel wall portions which are connected at least in part by a sealing connection, whereas the sealing connection has a region to which there is an access from the outside, so that at least a part of the sealing connection can be undone by introducing a pressurized liquid or gaseous medium through this access, to create an opening for introducing an infusion liquid into the capsule, whereas a first of the wall portions is dimensionally stable in the aforementioned region of the sealing connection and the second of the wall portions is flexible in this region and wherein the access to the sealing connection is provided by at least one aperture in the dimensionally stable wall portion of the capsule.

9. The capsule as claimed in claim 8, whereas a plurality of set-apart apertures are present in the dimensionally stable wall portion of the capsule.

10. A device for preparing an infusion beverage using comprising a capsule, the capsule comprises two parallel wall portions which are connected at least in part by a sealing connection, whereas the sealing connection has a region to which there is an access from the outside, so that at least a part of the sealing connection can be undone by introducing a pressurized liquid or gaseous medium through this access, and a holder for the capsule and at least one feed line for a pressurized liquid or gaseous medium, the feed line being embodied in such a way that, when the capsule is inserted into the holder of the device, the medium is guided through the access of the capsule to a sealing connection between the two parallel wall portions of the capsule, allowing at least a part of the sealing connection to be undone, an opening being created for introducing an infusion liquid into the capsule.

11. The device as claimed in claim 10, whereas the holder is embodied in such a way that the capsule can be at least partially held by the wall portions which are connected at least in part by the sealing connection.

12. The device as claimed in claim 10, comprising a receiving space in which the wall portions of the capsule can be at least partly received, the wall portions being connected by the sealing connection, the receiving space being embodied in such a way that the parallel wall portions are enclosed on both sides in an outer region in such a way that detachment of the sealing connection is prevented outward and allowed inward.

13. A method for preparing an infusion beverage using a capsule, where the capsule comprises two parallel wall portions which are connected at least in part by a sealing connection, whereas the sealing connection has a region to which there is an access from the outside, the method comprises supplying a pressurized liquid or gaseous medium through the access of the capsule to the sealing connection between the two parallel wall portions of the capsule, as a result of which at least a part of the sealing connection is undone, so that an opening is created for introducing an infusion liquid into the capsule.

14. The method as claimed in claim 13, whereas the pressurized liquid or gaseous medium is supplied at a pressure in the range of from 10 bar to 20 bar, in particular from 13 bar to 16 bar.

15. The method as claimed in claim 14, whereas the medium for undoing the sealing connection is identical to the infusion liquid used for preparing the infusion beverage.

16. The method as claimed in claim 13, whereas the medium for undoing the sealing connection is identical to the infusion liquid used for preparing the infusion beverage.

* * * * *